United States Patent [19]

Genot

[11] Patent Number: 5,744,698

[45] Date of Patent: Apr. 28, 1998

[54] ACCELEROMETRIC SENSOR FOR MEASURING THE PISTON KNOCK OF AN INTERNAL COMBUSTION ENGINE

[75] Inventor: Bernard Pierre André Genot, Roquettes, France

[73] Assignee: Siemens Automotive, S.A., Toulouse Cedex, France

[21] Appl. No.: 693,044

[22] PCT Filed: Jan. 30, 1995

[86] PCT No.: PCT/EP95/00314

§ 371 Date: Aug. 1, 1996

§ 102(e) Date: Aug. 1, 1996

[87] PCT Pub. No.: WO95/21384

PCT Pub. Date: Aug. 10, 1995

[30] Foreign Application Priority Data

Feb. 1, 1994 [FR] France ................ 94 01189

[51] Int. Cl.[6] ................................................ G01L 23/22
[52] U.S. Cl. ................................................... 73/35.11
[58] Field of Search ............................. 73/35.11, 35.13, 73/514.34, 654; 310/329

[56] References Cited

U.S. PATENT DOCUMENTS 4,961,338  10/1990  Komurasaki ............... 73/35.11
5,440,933  8/1995   Brammer et al. ........... 73/35.11

FOREIGN PATENT DOCUMENTS 0 184 666   6/1986   European Pat. Off. .
2 627 804   9/1989   France .
41 13 545 al 10/1991  Germany .

*Primary Examiner*—John E. Chapman
*Attorney, Agent, or Firm*—Herbert L. Lerner; Laurence A. Greenberg

[57] ABSTRACT

An accelerometric sensor for measuring pinking in an internal combustion engine. The sensor includes a base in the form of a sleeve with a flange extending therefrom and supporting at least one stacked piezoelectric ring, connecting disks and a seismic weight. The underside of the base is used as a contact surface between the sensor and the part to be measured. The underside has a central recess such that the average load distribution diameter over the contract surface is no smaller than the average of the shoulder. This shape may be achieved with a recess which is coaxial with the sleeve and which has a diameter greater than the external diameter thereof. The shape may alternatively be achieved by forming the underside in a concave shape.

6 Claims, 1 Drawing Sheet

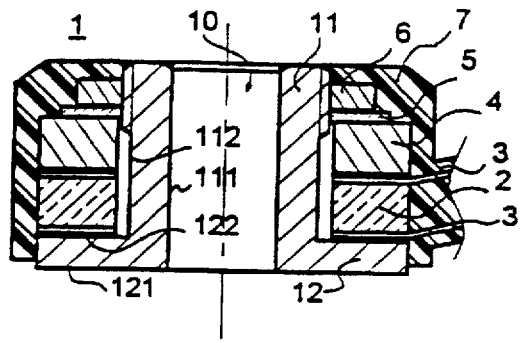
PRIOR ART Fig. 1A
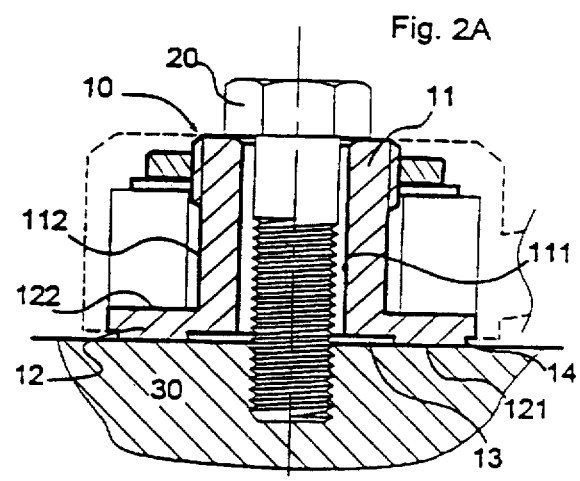
Fig. 2A
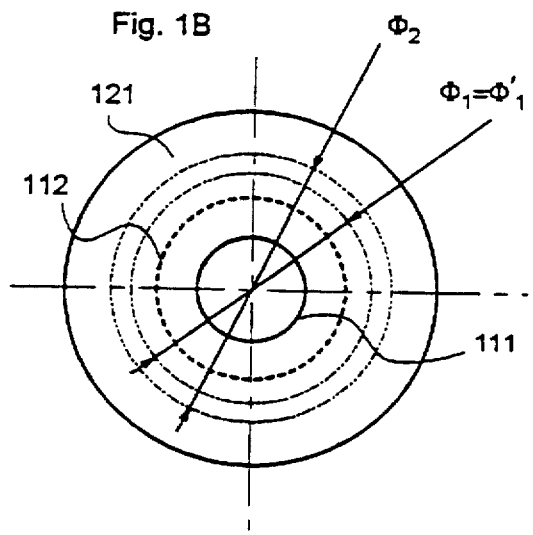
PRIOR ART Fig. 1B
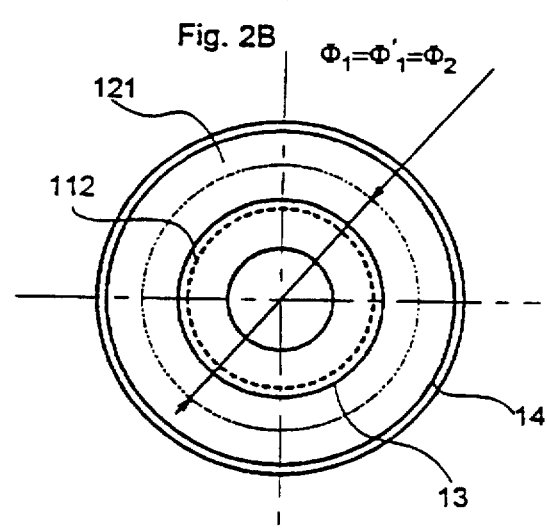
Fig. 2B
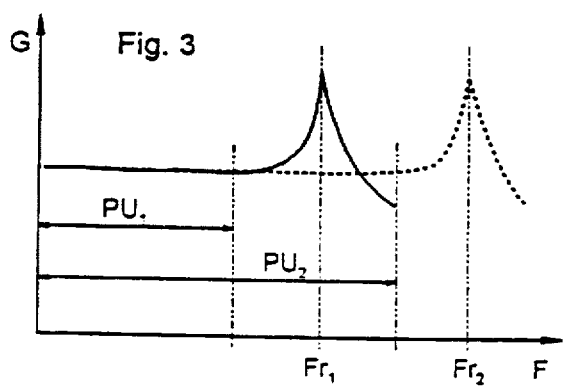
Fig. 3
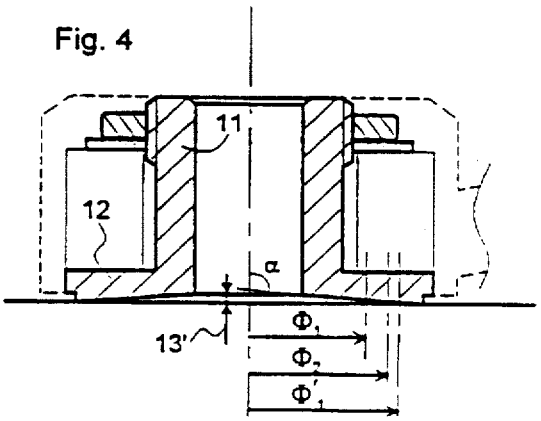
Fig. 4

5,744,698

ACCELEROMETRIC SENSOR FOR MEASURING THE PISTON KNOCK OF AN INTERNAL COMBUSTION ENGINE

BACKGROUND OF THE INVENTION

FIELD OF THE INVENTION

The present invention relates to an improvement on accelerometric sensors, and more particularly on sensors of the piezoelectric type used to detect and measure the piston knock of internal combustion engines.

Currently, accelerometric sensors of the non-resonating type are used to measure the piston knock of internal combustion engines, making it possible to measure the intensity of the vibrations which occur in the cylinder heads of the engine as a result of this phenomenon. The advantage of these types of sensors resides in their frequency response curve, which has an area in which their sensitivity is substantially constant as a function of the frequency. This usable range is limited to the higher frequencies because of the non-linearity generated by the resonance frequency of the sensor on its mount. But electronic control of engines requires measurement of the vibrations which reveal the presence of piston knock over a wider and wider range of frequencies.

For example, an accelerometric sensor known from the European patent 0 184 666, as shown in FIG. 1A, which represents the state of the art, is constituted by a base 10 in the form of a bushing 11 which ends in a flange 12 on which are stacked a piezoelectric washer 2 placed between two connecting disks 3 and a seismic mass 4, which stack is prestressed by an elastic washer 5 and a nut 6 screwed onto the bushing. Sensors of this type, which are widely used in automotive electronics, typically have a resonance frequency on the order of 12 to 15 Khz, which limits the measurement of piston knock to frequency ranges lower than 10 Khz. Various solutions have been proposed for raising the resonance frequency of this type of sensor to higher frequencies. Some examples which may be cited are the use of greater prestressing on the stack, which has the drawback of causing accelerated aging of the piezoelectric crystal, which reduces the reliability of the sensor, or the use of more rigid materials such as beryllium for the base plate, which increases the cost of the sensor, or even the application of a layer of grease, adhesive or polymer between the sensor and the surface on which it is mounted, which involves an added operation that is difficult to control.

SUMMARY OF THE INVENTION

The object of the present invention is to propose a solution which is simple, economic and easy to implement industrially.

This object of the invention is achieved by means of an accelerometric sensor of the type constituted by a base having the form of a bushing extended by a flange whose upper surface defines a shoulder on which are stacked at least one piezoelectric washer, connecting disks and a seismic mass, and whose lower surface is in contact with a part to be measured. According to the invention, the lower surface of the flange has a central recess such that the average diameter of the load distribution on the contact surface is greater than or equal to the average diameter of the shoulder.

According to a first embodiment of the present invention, the contact surface between the lower surface of the flange and the part has an annular shape whose internal diameter is greater than the external diameter of the bushing, and whose average diameter is at least equal to the average diameter of the shoulder.

According to one characteristic of this embodiment, the lower surface of the flange has a recess coaxial to the bushing with a diameter larger than the external diameter of the bushing.

According to a second embodiment of the present invention, the lower surface of the flange has a concavity coaxial to the bushing which extends across at least part of its surface.

The sensor according to the invention is intended to be mounted on a part by means of a bolt passing through the bore of the bushing. According to a remarkable characteristic of the invention, the area of the contact surface is determined in such a way as to avoid any permanent plastic deformation of the opposing surfaces due to the pressure exerted by the bolt.

BRIEF DESCRIPTION OF THE DRAWINGS

Other characteristic and advantages of the sensor according to the invention will emerge through a reading of the following description and an examination of the appended drawings, in which:

FIG. 1A represents a sectional view of a sensor of the prior art,

FIG. 1B represents a view from underneath the base of a sensor according to the prior art, FIG. 2A represents a sectional view of a first embodiment of the sensor according to the invention, FIG. 2B represents a view from underneath the base of a sensor according to the invention, FIG. 3 represents the comparative frequency response curves of a sensor of the prior art and a sensor according to the invention, FIG. 4 represents a sectional view of a second embodiment of the sensor according to the invention.

DESCRIPTION OF THE PREFERRED EMBODIMENTS

FIG. 1, which is partially described in the preamble, represents a sectional view of an accelerometric sensor 1, for example of the type used to measure the vibrations generated in a cylinder head of an internal combustion engine, vibrations whose intensity reveals the presence of piston knock. This sensor is composed of a piezoelectric washer 2 placed between two metallic disks 3 for ensuring the electrical connection of the surfaces of the washer to a connector (not represented). A seismic mass 4 with a shape substantially identical to the washer 2 is pressed against the preceding stack by an elastic washer 5 and a nut 6. These elements are mounted on a base 10 in the form of a bushing 11 which ends in a flange 12 coaxial to the bushing. The upper surface of the flange 12 forms a shoulder 122, defined by the external wall 112 of the bushing 11 and the edge of the flange on which the stack rests. The end of the bushing 11 opposite the flange 12 has a threading onto which the nut 6 is screwed, thus allowing an initial stress to be applied to the stack. A casing 7 made of plastic covers the entire sensor except for a bore 111 recessed into the bushing 11, which is intended to receive a clamp bolt 20 (FIG. 2A) and the lower surface of the flange, which serves as the contact surface 121 with a part 30 (FIG. 2A), for example a cylinder head of the engine in which the piston knock is to be detected.

FIG. 1B represents a view from underneath the base 10. As seen in this view, the contact surface 121 extends from the bore 111 to the edge of the flange, while the shoulder 122 runs from the external wall 112 of the bushing to the same edge of the flange. The average geometric diameter of the contact surface 121 is symbolized by the reference mark $\phi_1$ and that of the shoulder 122 is symbolized by the reference mark $\phi_2$. It is also evident that the diameter $\phi_1$ is considerably smaller than $\phi_2$. Since the surfaces in contact with the flange and with the part 30 are substantially parallel before clamping, the contact pressure generated by the clamping of the bolt 20 is uniformly distributed. For this reason, the average diameter $\phi'_1$ of the load distribution, which is defined as the diameter of a circle on the contact surface 121 such that the load carried by the external surface of this circle is equal to that carried by the internal surface of this circle, is the same as the average geometric diameter $\phi_1$. In cases in which the surface of the part 30 is not perfectly flat, this causes the flange 12 to have a behavior analogous to that of a disk which is fixed at the center and free at the outer edges, resulting in the transmission of an extraneous vibration to the piezoelectric washer. As seen in FIG. 3, in which the frequency response curve of this sensor is represented by a solid line, this translates into the presence of a resonance frequency $Fr_1$ which is relatively low and a usable range $PU_1$, in which the signal from the sensor is substantially linear, which is substantially reduced.

FIG. 2A represents a sectional view of a first embodiment of the sensor according to the invention, which shows the base 10 in greater detail. This base has, on the internal surface of the flange 12, a recess 13 coaxial to the bushing 11. The diameter of this recess is greater than the diameter of the external wall 112 of the bushing 11. The depth of this recess was limited to several tenths of a millimeter so as not to weaken the flange 12. In this way, a central recess was created in the internal surface of the flange 12, at a right angle to the bushing 11. A recess 14 was also formed on the periphery of the lower surface of the flange. These alterations have the effect of modifying the contact surface 121 of the base 10 on the piece 30. As seen in FIG. 2B, this contact surface has an annular shape whose internal diameter, delimited by the diameter of the recess 13, is greater than the external diameter of the bushing 11. The radial depth of the recess 14 was chosen so that the average diameters $\phi_1$, $\phi'_1$, $\phi_2$, would be approximately the same. This disposition offers the advantage of practically eliminating the extraneous vibration of the flange 12 and, as seen in the frequency response curve represented by a dotted line in FIG. 3, of pushing the resonance frequency $Fr_2$ of the sensor toward higher frequencies. The usable range $PU_2$ of the sensor according to the invention is thereby increased considerably.

It was possible to determine experimentally that if the average diameter $\phi_1$, (or $\phi'_1$, respectively) of the contact surface 121 is greater than the average diameter $\phi_2$ of the shoulder, a similar improvement, though of lower intensity, occurs in the frequency response curve of the sensor. For this reason, the presence of the recess 14 is not indispensable. However, this recess has certain advantages, for example during the encasing of the sensor, when it makes it possible to limit the casing 7 in a precise way.

In this embodiment, as in the prior art represented in FIGS. 1A and 1B, the internal surface of the flange 12 is substantially parallel to the surface of the part 30. For this reason, the contact pressure exerted by the flange 12 on the part 30, under the load produced by the clamping of the bolt 20, is substantially uniform, and the average geometric diameter $\phi_1$ of the contact surface 121 cannot be distinguished from the average diameter $\phi'_1$ of the load distribution.

In a second embodiment represented in FIG. 4, the same result can be obtained with a different profile of the internal surface of the flange, for example one that is slightly concave. A flange 12 may be embodied so that the angle $\alpha$ formed by the generatrix of the internal surface and the axis of the bushing 11 is slightly larger than 90 degrees. By way of example, a 90.5° angle $\alpha$ makes it possible to obtain, in a sensor of normal size, a concavity 13' of several tenths of a millimeter. In this case, before clamping, the sensor rests on the part 30 by means of the external edge of the internal surface of the flange 12. After clamping, the contact surface 121 can extend across the entire internal surface of the flange, but the distribution of the contact pressure, which is higher on the periphery than at the center, makes it possible to obtain an average diameter $\phi'_1$ of the load distribution which is displaced toward the periphery and which is greater than or equal to the average diameter $\phi_2$ of the shoulder, even though the average geometric diameter $\phi_1$ remains smaller than $\phi_2$.

It is understood that the concavity of the internal surface of the flange is not necessarily obtained with a truncated shape as in the example described, but can be obtained by defining a radius of curvature for this surface. Likewise, the shape chosen for obtaining this concavity does not necessarily extend across the entire internal surface of the flange.

It is important to determine the area of the contact surface as a function of the materials of the part 30 and the base 10, respectively, and of the clamping pressure applied to the bolt 20. In effect, the maximum pressure exerted by the base on the part 30 must not exceed the elastic limit of the less resistant of the two materials, so as not to deform the contact surface in any lasting way which, in case of a deformation of the surface of the part 30, would have the consequence of making a replacement of the sensor difficult, or even impossible. This consideration must also be taken into account in case of a contact surface 121 which is flat, but of reduced area. For the piston knock sensors currently used in automotive electronics, whose external diameter is on the order of twenty millimeters and whose opposing materials are steel, aluminum or brass, a ring width of a few millimeters is enough for the contact surface.

I claim:

1. An accelerometric sensor assembly for measuring an acceleration of a component, comprising:
    a base in the form of bushing with a flange formed thereon, said flange having an upper surface defining a shoulder and a lower surface defining a contact surface pressing against a component of which an acceleration is to be measured;
    at least one piezoelectric washer, connecting disks, and a seismic mass stacked on said shoulder of said flange;
    said lower surface of said flange being formed with a central recess such that a load generated by a pressure on said contact surface is substantially equally distributed on both sides of a circle having a diameter greater than or equal to an average diameter of said shoulder.

2. The sensor assembly according to claim 1, wherein said bushing has an outer diameter, and said contact surface between said lower surface of said flange and the component has an annular shape defining an inner diameter greater than said outer diameter of said bushing, and said contact surface having an average diameter at least equal to the average diameter of said shoulder.

3. The sensor assembly according to claim 2, wherein said recess formed in said lower surface of said flange is coaxial with said bushing, and said recess has a diameter greater than said outer diameter of said bushing.

4. The sensor assembly according to claim 1, wherein said bushing has an outer diameter, and wherein said recess formed in said lower surface of said flange is coaxial with said bushing, and said recess has a diameter greater than said outer diameter of said bushing.

5. The sensor assembly according to claim 1, wherein said lower surface of said flange is formed with a concave surface, said concave surface being disposed coaxially with said bushing and extending across at least part of said lower surface.

6. The sensor assembly according to claim 1, including a bolt for attaching said base to the component, said bushing being formed with a central bore through which said bolt protrudes, and wherein an area of said contact surface is determined as a function of a pressure exerted by said bolt and of respective material properties of said contact surface of said base and a contact surface of the component in such a way as to avoid any permanent plastic deformation thereof.

* * * * *